United States Patent
Marggraff

(10) Patent No.: US 8,300,252 B2
(45) Date of Patent: Oct. 30, 2012

(54) MANAGING OBJECTS WITH VARYING AND REPEATED PRINTED POSITIONING INFORMATION

(75) Inventor: Jim L. Marggraff, Lafayette, CA (US)

(73) Assignee: LiveScribe, Inc., Oakland, CA (US)

( * ) Notice: Subject to any disclaimer, the term of this patent is extended or adjusted under 35 U.S.C. 154(b) by 655 days.

(21) Appl. No.: 12/486,636

(22) Filed: Jun. 17, 2009

(65) Prior Publication Data
US 2010/0033766 A1    Feb. 11, 2010

Related U.S. Application Data

(60) Provisional application No. 61/073,737, filed on Jun. 18, 2008.

(51) Int. Cl.
G06F 3/12 (2006.01)

(52) U.S. Cl. ........ 358/1.15; 358/1.1; 382/203; 382/195; 382/190; 382/181; 345/179; 345/175; 345/173; 700/213

(58) Field of Classification Search .................. None
See application file for complete search history.

(56) References Cited

U.S. PATENT DOCUMENTS

| | | | |
|---|---|---|---|
| 5,390,299 A | 2/1995 | Rege et al. | |
| 7,142,197 B2 | 11/2006 | Wang et al. | |
| 7,175,095 B2 | 2/2007 | Pettersson et al. | |
| 7,281,664 B1 | 10/2007 | Thaeler et al. | |
| 7,290,719 B2 | 11/2007 | Ladas et al. | |
| 7,343,042 B2 | 3/2008 | Braun et al. | |
| 2002/0065853 A1* | 5/2002 | Takahashi et al. | 707/527 |
| 2004/0229195 A1 | 11/2004 | Marggraff et al. | |
| 2005/0236492 A1 | 10/2005 | Ladas et al. | |
| 2005/0246337 A1 | 11/2005 | Forman et al. | |
| 2006/0033725 A1* | 2/2006 | Marggraff et al. | 345/179 |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1* | 4/2006 | Marggraff et al. | 715/727 |
| 2006/0080609 A1 | 4/2006 | Marggraff et al. | |

(Continued)

FOREIGN PATENT DOCUMENTS

EP    1681649 A1    7/2006

(Continued)

OTHER PUBLICATIONS

Sandstrom et al., Device and System for Information Management, WO 02/39377, May 2002.* PCT International Search Report and Written Opinion, PCT Application No. PCT/US2009/047855, Jul. 27, 2009, 9 pages.
European Extended Search Report, European Application No. 09767767.8, Jul. 20, 2012, 7 pages.

*Primary Examiner* — Benny Q Tieu
*Assistant Examiner* — Paul F Payer
(74) *Attorney, Agent, or Firm* — Fenwick & West LLP

(57) ABSTRACT

A system and method for identifying captured written data associated with a writing surface using a pen-based computing system are described. In one embodiment, a series of writing surfaces, such as notebooks, are produced, each including a plurality of pages that have an encoded pattern. In an embodiment, each writing surface is also associated with an identifier recognizable by a smart pen or other data capture device. When the smart pen captures written data from a writing surface, the smart pen determines whether the pen-based computing system includes stored written data previously captured from a writing surface having the same encoded pattern as the writing surface from which written data is currently being captured.

25 Claims, 3 Drawing Sheets

U.S. PATENT DOCUMENTS

| | | |
|---|---|---|
| 2006/0125805 A1 | 6/2006 | Marggraff et al. |
| 2006/0127872 A1 | 6/2006 | Marggraff et al. |
| 2006/0292543 A1 | 12/2006 | Marggraff et al. |
| 2007/0097100 A1 | 5/2007 | Marggraff et al. |
| 2007/0280627 A1 | 12/2007 | Marggraff et al. |

FOREIGN PATENT DOCUMENTS

| | | |
|---|---|---|
| WO | WO 2006/076203 A2 | 7/2006 |
| WO | WO 2007/141204 A1 | 12/2007 |
| WO | WO 2008/002239 A1 | 1/2008 |

* cited by examiner

MANAGING OBJECTS WITH VARYING AND REPEATED PRINTED POSITIONING INFORMATION

CROSS REFERENCE TO RELATED APPLICATIONS

This application claims the benefit of U.S. Provisional Application No. 61/073,737, filed Jun. 18, 2008, which is incorporated by reference in its entirety.

BACKGROUND

This invention relates generally to pen-based computing systems, and more particularly to associating captured digital data with a writing surface.

Printed systems exist that provide an absolute and relative reference for a device scanning a surface. One such system uses dot-enabled paper including an encoded dot pattern that can be imaged by a scanning device, such as a smart pen. The scanning device scans a portion of the dot pattern and determines the location of the scanned portion relative to the rest of the dot-enabled paper using the dot pattern. The ability to determine location of the scanning device is important for many applications, such as electronic capture of written notes made by a user on the dot-enabled paper.

A notebook may contain multiple pages of dot-enabled paper, each page having a different dot pattern. In such a notebook, the scanning device is able to scan a portion of the dot pattern on a page in the notebook and determine both the identity of the particular page (e.g., the page number) and the location of the portion of the dot pattern within the page. The dot pattern is often generated by an algorithm that is capable of producing only a finite number of unique dot patterns spread over a certain area or a certain number of pages. The number of unique dot patterns may be limited for other reasons, such as limitations in the scanning device or in the production or distribution of the dot-enabled paper.

As a result, it is often necessary to produce multiple instances of dot-enabled paper having the same dot pattern. For example, multiple copies of a notebook may be produced where a particular page of one notebook has the same dot pattern as the corresponding page of another notebook. For example, the tenth page in multiple notebooks is encoded with the same dot pattern. In this situation, the scanning device will be unable to distinguish between two notebooks, and notes taken on two corresponding pages of the two notebooks will be assumed to be in the same position by the scanning device. Therefore, even though the user most likely intends for the notes on the two pages to remain separate, they will be combined when stored by the scanning device and when later accessed by the user.

It is also possible to describe a function, such as a calculator, associated with a region of a page having a particular dot pattern. This function is activated by applying the scanning device to the region of the page. However, if the scanning device is applied to a region of another page with the same dot pattern, the function will still be activated whether or not the user intended to activate the function.

Since every page of dot-enabled paper cannot have a unique dot pattern for the reasons discussed above, there is a need to reuse the same dot pattern for new notes or functions. Accordingly, a system and method is needed to enable electronic capture of written data from multiple copies of dot-enabled paper having the same dot pattern that avoids ambiguities and unwanted combining of captured written data while minimizing the burden placed on the user.

SUMMARY

The described embodiments present a system and method for identifying captured written data associated with a writing surface using a pen-based computing system. For example, the described embodiments allow a user to capture written data, such as notes, from multiple copies of "dot-enabled" paper having the same encoded pattern without unwanted combining of written data captured from different printed sources.

In one embodiment, a series of writing surfaces, such as notebooks, each including a plurality of pages of dot-enabled paper is produced. In an embodiment, each writing surface is also associated with an identifier that can be recognized by a smart pen or other data capture device. For example, the identifier comprises a predefined portion of the writing surface including data describing an encoded pattern used by the writing surface. A smart pen receives the identifier, for example by scanning the predefined portion of the writing surface, and determines the encoded pattern associated with the identifier. A pen-based computing system including the smart pen determines whether written data, such as notes, that has previously been captured is associated with the encoded pattern associated with the received identifier. If previously-captured written data is associated with the encoded pattern, a request to archive the previously captured written data is generated. Receiving an input responsive to the request to archive the previously captured written data disassociates the previously-captured written data from the encoded pattern associated with the identifier and stores the previously-captured written data. Written data captured after disassociating the written data from the encoded pattern is then associated with the encoded pattern when stored.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
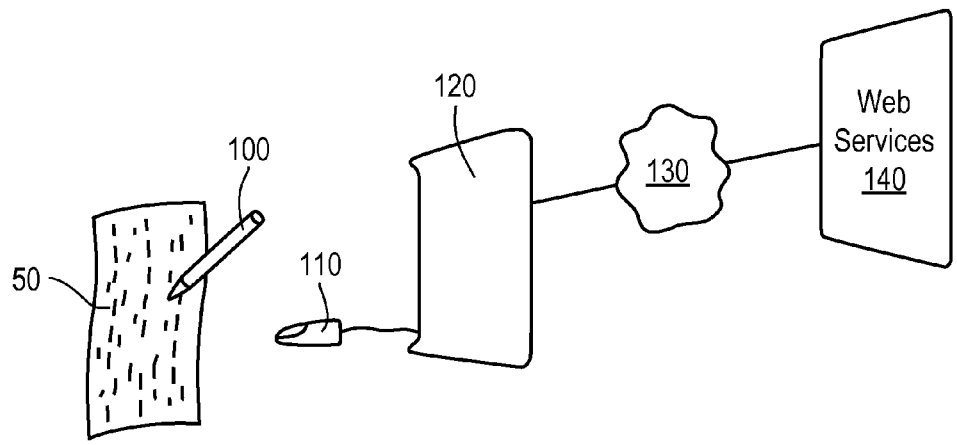
FIG. 1 is a schematic diagram of a pen-based computing system in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains, including electronic paper.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information, playing audio or responding in context to physical interaction such as tapping, tracing, or selecting other pre-existing visual information. In other embodiments, the smart pen 100 includes additional input modalities, such as motion sensing or gesture capture, and/or additional output modalities, such as vibrational feedback. By receiving different types of input, the smart pen 100 may simultaneously capture different types of data, such as audio, movement and/or written or text, which can be used to generate a session including different types of data.

Figure 2:
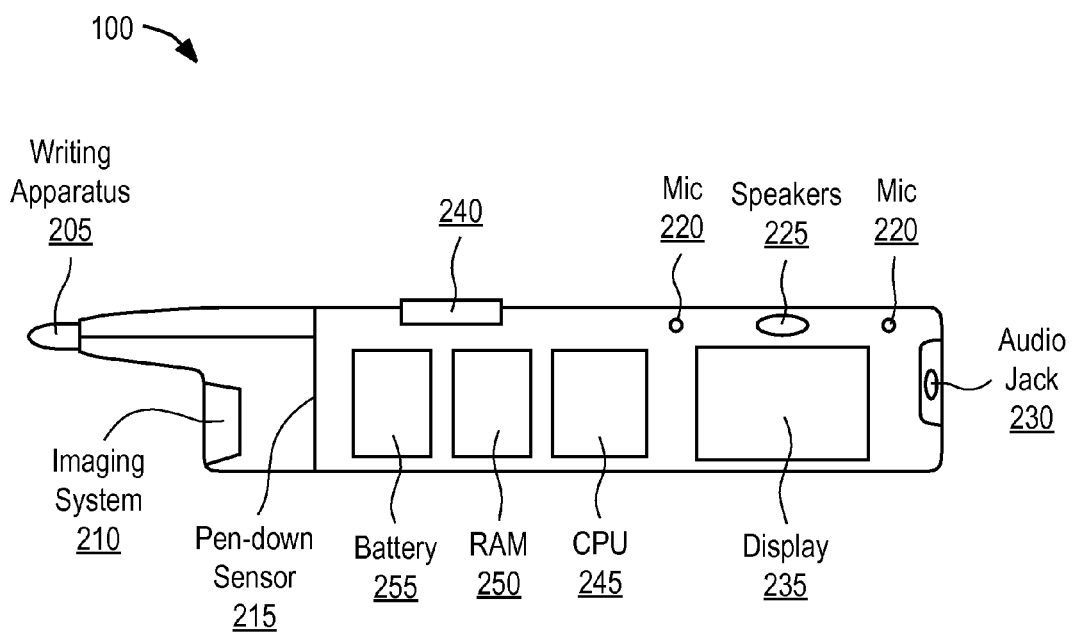
FIG. 2 is a diagram of a smart pen for use in the pen-based computing system in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system. For example a variety of types of switches including buttons, rocker panels, capacitive sensors, heat sensors, pressure sensors, biometric sensors or other sensing devices could be added.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. For example, the encoded dot pattern varies in a pattern known to the smart pen 100, allowing the smart pen 100 to scan a portion of the writing surface 50 and determine the location of the scanned portion relative to the writing surface 50 as a whole. This position of the smart pen 100 may be referred to using coordinates in a predefined "dot space," and the coordinates can be either local (i.e., a location within a page of the writing surface 50) or absolute (i.e., a unique location across multiple pages of the writing surface 50). Additionally, a user may write on multiple pages of dot-enabled paper where each page is encoded with a different dot pattern, enabling the smart pen 100 to identify an individual page as well as the location within the individual page that is being accessed by the smart pen 100.

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50, entirely by the smart pen 100, or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sense movement of the smart pen 100 tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications, such as Bluetooth, WiFi, RF, infrared and ultrasonic sound. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also employ buttons, such as a power button or an audio recording button and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and/or gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use other appropriate means for achieving the same function. In an embodiment, data captured by the imaging system 210 is subsequently processed, allowing one or more content recognition algorithms, such as character recognition, to be applied to the received data.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until off-loaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100.

In an embodiment, the operating system and applications support a sequence of independent and/or concurrent input and output modalities and seamless transitions between these modalities to provide for language learning. For example, a language learning (LL) application running on an operating system supporting modality independence, concurrence and sequencing might begin a lesson announcing that today is a lesson in writing, reading, speaking and listening to Chinese. The smart pen 100 might then animate the creation of a Mandarin character, drawing strokes of the character in proper order on the display 235, while simultaneously announcing the character's pronunciation via the speaker 225. The operating system would enable the simultaneous display and synchronized delivery of audio. The LL application might then prompt the user to draw each stroke of the character, following the animated display of each stroke on the display 225, thus sequencing the transition between modalities of visual output of information displayed on the smart pen 100, in a synchronized manner, with the input of stroke data by a user. As the user becomes more fluent with the creations of the character, and begins writing more rapidly, perhaps writing ahead of the strokes displayed, the OS will enable real time capture and interpretation of strokes and respond with proper displaying and audio as appropriate, engaging the user in a multimodal dialogue. As the user demonstrates proficiency in writing, and the smart pen 100 begins to be lead by the user, displaying strokes in response, rather than leading with strokes, the smart pen 100 might verbally compliment the user and request the user to speak the sound for the character during or after the stroke writing. As the user speaks the character sound, the smart pen 100 could record the sound and compare it to an exemplar. The smart pen 100 might then prompt the user by playing back the exemplar pronunciation and the user pronunciation, providing commentary and/or visual guidance regarding correctness in pronunciation The smart pen 100 might then prompt the user to listen, write, and speak, announcing a series of words one by one, waiting for the user to write and speak the words, while comparing the input speech and writing to exemplars, and redirecting the user to repeat writing or speaking as necessary.

In an extension of this example, the smart pen 100 might prompt the user to interact with a pre-printed Language Learning text or workbook. The smart pen 100 might move the user's attention among multiple displays, from text, to the workbook, to a user's notebook, while continuing a dialogue involving the smart pen 100 speaking and displaying independently or concurrently, directing the user to speak, write, and look at information independently or concurrently. Various other combinations of input modalities and output modalities, and sequencing, are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword or a physical motion, may indicate that subsequent input is associated with one or more application commands. Input with a spatial and/or temporal component may also be used to indicate that subsequent data. Examples of input with a spatial input include two dots side-by-side. Examples of input with a temporal component include two dots written one immediately after the other. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Writing Surface Characteristics

In one embodiment, a series of writing surfaces 50, such as notebooks, are produced so that each writing surface 50 includes a plurality of pages of dot-enabled paper. The pages of dot-enabled paper included in a first writing surface 50 from the series that have encoded patterns (referred to herein as "dot patterns") differing from the dot patterns encoded on pages of dot-enabled paper included in a second writing surface 50 from the series. For example, in a series of eight notebooks each including one hundred pages of dot-enabled paper, each page of dot-enabled paper in the series is encoded with a different dot pattern. This allows a user to capture written data, such as notes, from eight hundred pages of dot-enabled paper, each encoded with a different dot pattern. In an embodiment, portions of the dot-enabled paper in the series, such as the area occupied by a printed control region at a specified location of a page, may have common dot patterns. The example series of eight notebooks described above may be mass produced and each notebook in the series may be separately provided to users. If a user has already used certain notebooks from the series, the user may elect to use a different notebook to prevent association of notes from a new notebook with notes from a previously used notebook.

Each writing surface 50 may be associated with an identifier, allowing a user to distinguish between different writing surfaces 50 or to select a writing surface 50 that has not been previously used. For example, each notebook in a series is associated with an identifier, which allows a user to identify a notebook in the series including a dot pattern not previously used. The identifiers provide a user-visible indication of the dot-pattern included in a writing surface 50, such as a notebook, as it is difficult for a user to visually scan and distinguish between dot patterns used by different writing surfaces 50. For example, in a series of eight notebooks, the cover of each notebook in the series is labeled with a number from one to eight or coded with different colors, different user-visible patterns or other visually distinct markings, so that a user may determine the dot pattern used by the notebook by simply inspecting the notebook cover. For example, if a user has already used notebooks labeled 2, 5 and 7, the user may avoid using similarly labeled notebooks so that additional written data is captured from writing surfaces 50 using different dot patterns.

Alternatively, the identifier associated with a writing surface 50 may be scanned by a smart pen 100 to determine if the user has already captured written data from a writing surface 50 including the dot pattern associated with the scanned identifier. The identifier may be placed at a predefined location of the writing surface 50, such as the front cover of the writing surface 50, a sticker affixed to the front or back cover of the writing surface 50, a corner of the writing surface 50 or any other suitable location, and provides the smart pen 100 with data identifying the writing surface 50 and/or the dot pattern used by the writing surface 50. Alternatively, because different writing surfaces 50 include different dot patterns, the smart pen 100 is able to scan any point within a page of the writing surface 50 and identify the writing surface 50 based on the scanned dot pattern. In one embodiment, after accessing the identifier, the smart pen 100 indicates the writing surface 50 associated with the identifier. For example, the smart pen 100 accesses an identifier associated with a notebook and presents, using the display 235 and/or the speakers 225, data associated with the notebook, such as an indication that the notebook is number seven within a series.

However, in certain scenarios, a user may desire to capture written data from a particular writing surface 50 even though written data has previously been captured from a writing surface 50 including the same dot pattern. For example, the user may use the most readily accessible writing surface 50, even if written data has previously been captured from a different writing surface 50 including the same, or a similar, dot pattern. Or, a user may have used writing surfaces 50 including each dot pattern used by a series and reuses writing surfaces 50 to capture additional written data.

Accessing the identifier with the smart pen 100 may also allow the smart pen 100 to determine whether the smart pen 100 has previously captured written data from a writing surface 50 using the dot pattern associated with the accessed identifier. In an embodiment, the smart pen 100 alerts the user when the identifier is associated with a dot pattern from which data was previously captured using the smart pen 100. For example, the smart pen 100 determines whether written data has previously been captured from a different writing surface 50 using the dot pattern associated with an identifier accessed by the smart pen 100 and alerts the user, allowing the user to select a different writing surface 50. A method for separating captured written data from the encoded pattern of the writing surface 50 from which the written data was captured is further described below in conjunction with FIG. 3.

Allowing written data to be separated from the encoded pattern of the writing surface 50 from which the written data was captured allows a single writing surface 50 to be reused to capture additional written data. For example, the smart pen 100 captures written data from a writing surface 50, such as a notebook, including dot-enabled paper. The written data is then stored by the smart pen 100, or by a pen-based computing system which includes the smart pen 100. Additional written data, such as notes, is then captured from a second copy of the writing surface 50, where each page of dot-enabled paper in the second copy of the writing surface has an encoded pattern corresponding to a page of the original writing surface 50. By archiving the written data captured from the original writing surface 50, the written data captured from the second copy of the writing surface 50 is not combined or associated with written data captured from the original writing surface 50.

Decoupling Written Data from a Dot Pattern

Figure 3:
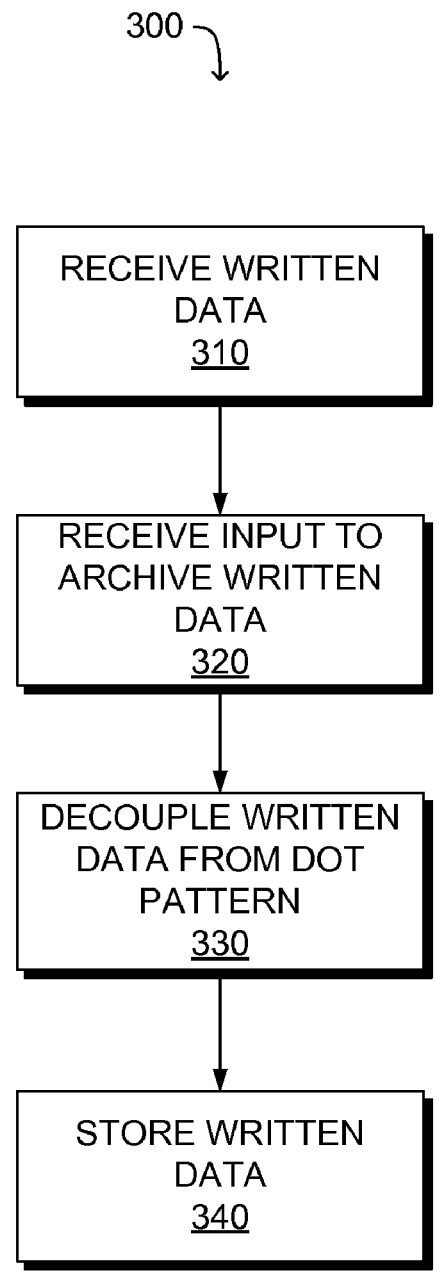
FIG. 3 is a flow chart of a method for separating captured writing data from an encoded pattern of a writing surface, in accordance with an embodiment of the invention.

FIG. 3 shows a method 300 for decoupling written data captured from a writing surface 50 from a dot pattern included on the writing surface 50. This allows later capture of additional written data from the same writing surface 50 without associating the additional written data with the originally captured written data. Those of skill in the art will recognize that other embodiments can perform the steps of FIG. 3 in different orders. Moreover, other embodiments can include different and/or additional steps than the ones described here. In an embodiment, steps depicted in the method 300 shown in FIG. 3 are implemented by instructions for performing the described actions are embodied or stored within a computer readable medium, e.g., onboard memory 250, that are executable by a processor 245. Those of skill in the art will recognize that the steps of the method 300 may be implemented in embodiments of hardware and/or software or combinations thereof. Moreover, other embodiments can include different and/or additional states or state transitions than the ones shown in FIG. 3.

In an embodiment, a user archives written data captured from a writing surface 50, allowing the dot pattern included in writing surface 50 to be reused for later capture of additional written data. Archived written data is digitally stored, but is not associated with the dot pattern of the writing surface 50 from which the written data was captured. In an embodiment, archived written data, such as notes, is not augmented with additional written data captured from the writing surface 50 from which the archived written data was captured or is not augmented with additional written data captured from a second writing surface 50 including the same dot pattern as the writing surface 50 from which the archived written data was captured. When archived written data is decoupled from the dot pattern of the writing surface 50 from which it is captured, the dot pattern of the writing surface from which the archived written data was captured may be used to capture new written data different from the originally-captured written data. For example, a notebook having pages including the same dot pattern as pages from a previously used notebook can be used to capture new notes without conflicting with notes captured from the previously used notebook. Before capturing the new notes, the user archives the previously taken notes. After capturing the new notes, the new notes may also be separately archived from the previously archived notes, allowing for additional capture of a third set of notes from the original dot pattern.

Initially, written data is received 310 from the imaging system 210 of the smart pen 100. The received written data is coupled to a dot pattern used by the writing surface 50 from which the writing data is received 310. An input is then received 320 by the smart pen 100, such as via the imaging system 210 or the one or more microphones 220, or by the computing system 120 to archive the written data. When written data is archived, additional data associated with the written data, such as audio data linked to the captured written data, may also be included with the archived written data. Responsive to receiving 320 the input to archive the written data, the written data is decoupled 330 from the dot pattern used by the writing surface 50 from which the written data was received 310. The written data is then stored 340 without being coupled to the dot pattern associated with the writing surface 50 from which the written data was received 310. In one embodiment, the written data is copied from the onboard memory 250 of the smart pen to the computing system 120, where it is stored 340. Once the written data is stored, new written data may be captured from a writing surface 50 including the same dot pattern from which the written data was received 310 as if the archived written data was not received, effectively reusing the original dot pattern and corresponding writing surface 50, or writing surfaces 50.

Figure 4:
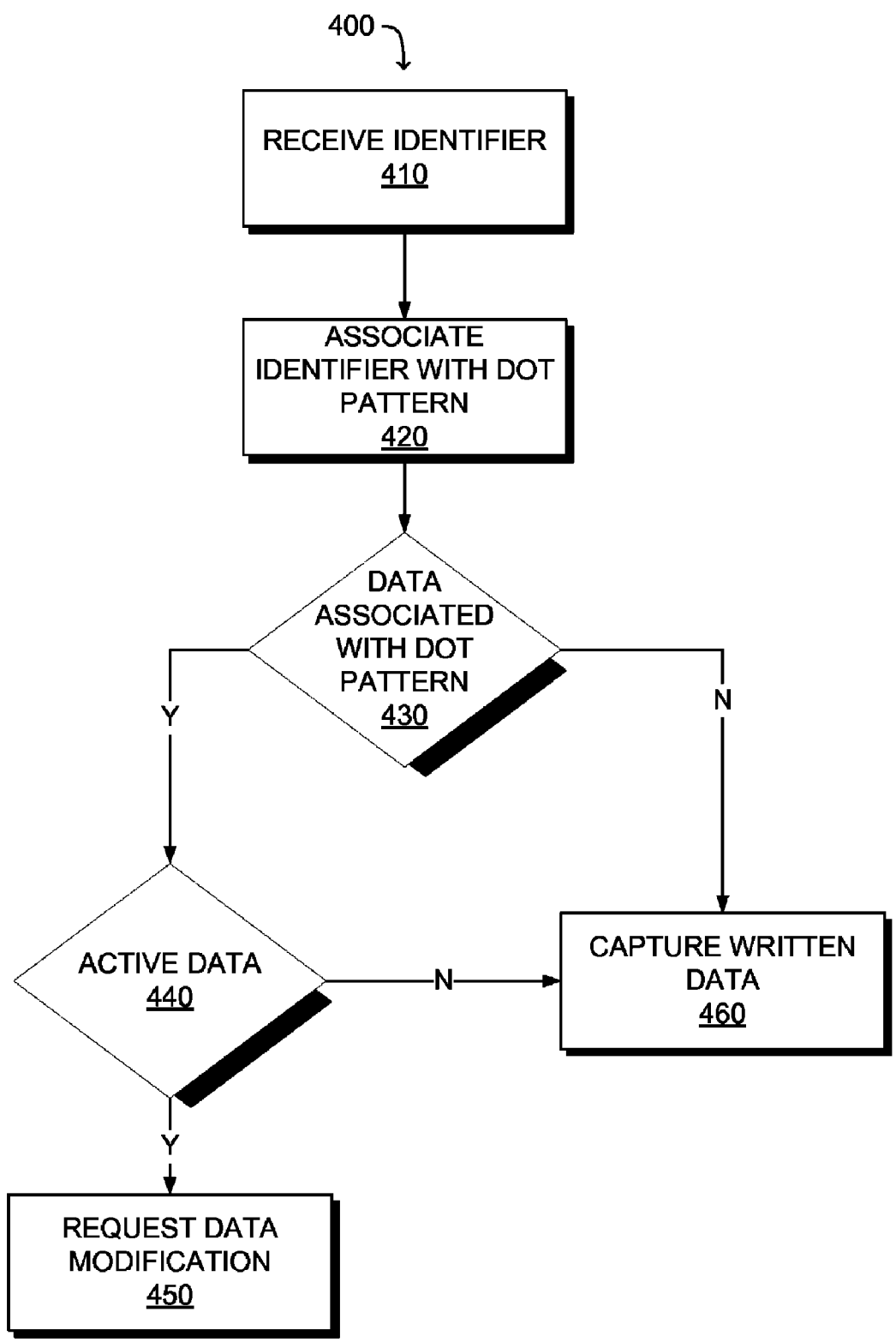
FIG. 4 is a flow chart of a method for identifying a writing surface associated with written data in accordance with an embodiment of the invention.

In one embodiment, a user activates a notebook, or other writing surface 50, including a plurality of dot-enabled pages before writing notes, or other written data, on the dot-enabled pages using the smart pen 100 to associate the writing surface 50 with data captured from the writing surface 50. FIG. 4 shows a method 400 for associating written data with a writing surface 50 according to one embodiment of the invention. Those of skill in the art will recognize that other embodiments can perform the steps of FIG. 4 in different orders. Moreover, other embodiments can include different and/or additional steps than the ones described here. In an embodiment, steps depicted in the method 400 shown in FIG. 4 are implemented by instructions for performing the described actions are embodied or stored within a computer readable medium, e.g., onboard memory 250, which are executable by a processor 245. Those of skill in the art will recognize that the steps of the method 400 may be implemented in embodiments of hardware and/or software or combinations thereof. Moreover, other embodiments can include different and/or additional states or state transitions than the ones shown in FIG. 4.

Activating the notebook determines whether notes, or other written data, have already been captured from a writing surface 50 including the dot pattern included in the notebook to prevent newly captured written data, such as notes, from conflicting with the previously-captured written data. In one embodiment, the writing surface 50 is activated when the smart pen 100 receives 410 an identifier associated with the dot pattern used by the writing surface 50. For example, the identifier is received 410 by scanning the identifier associated with the writing surface 50 with the imaging system 210 of the smart pen 100 to capture data from the identifier describing the writing surface 50 and the dot pattern associated with the writing surface 50. As another example, a notebook in a series of notebooks each using unique dot patterns may include an identifier in a specific region, such as a sticker or a defined location on the notebook cover or on a notebook page, so that when the imaging system 210 captures data from the identifier, the notebook is activated. If a sticker is used for the identifier, the sticker may be placed in a location that necessitates removal of the sticker prior to using the notebook or otherwise conspicuously placed to reduce the likelihood that the sticker is ignored by a user. Alternatively, a writing surface 50 may be activated by scanning a page of dot-enabled paper within the writing surface 50, and the smart pen 100 recognizes the notebook from the dot pattern included on the scanned page.

In an embodiment, data associating 420 an identifier with a dot pattern is stored in the onboard memory 250 of the smart pen 100. Alternatively, the smart pen 100 analyzes the data captured from the identifier to associate 420 the identifier with a dot pattern. After associating 420 the dot pattern with the identifier, the smart pen 100 determines 430 whether previously captured written data is associated with the dot pattern. For example, the smart pen determines 430 whether written data, such as notes, or other written data, have previously been captured from a writing surface 50 including the identified dot pattern. To determine 430 whether previously captured written data is associated with the identified dot pattern, the smart pen 100 examines the internal memory 250 of the smart pen and/or examines the computing system 120. If no captured data is associated with the dot pattern, written data is captured 460 from the writing surface 50 using the imaging system 210.

Responsive to determining 430 that previously captured written data is associated with the identified dot pattern included in the writing surface 50, the smart pen 100 determines 440 whether the previously captured written data is archived, deleted or active. In one embodiment, if no active written data is associated with identified dot pattern, the smart pen 100 indicates, using the display 235 or the speakers 225, that activation of the writing surface 50 is complete and that written data may be captured 460 from the writing surface 50 using the imaging system 210. If the smart pen 100 determines 440 that currently active written data is associated with the identified dot pattern, the smart pen 100 may communicate, via the display 235 or the speakers 225, a request 450 for the user to archive the existing notes before capturing written data from the writing surface 50 being activated. In one embodiment, the smart pen 100 does not capture written data from the writing surface 50 until existing notes associated with the identified dot pattern are archived or deleted.

In one embodiment, a smart pen 100 locally stores in its onboard memory 235 a table indicating whether or not written data has already been captured from a dot pattern associated with a writing surface 50. In one embodiment, the table includes a binary value and an identifier for each writing surface 50, such as a binary value and an identifier for each notebook in a series of notebooks. A value of "0" associated with an identifier indicates that the user has not captured written data from the writing surface 50 corresponding to the identifier or that written data captured from the writing surface 50 is archived or otherwise not currently active. A value of "1" indicates that the user has captured written data from that notebook and that the written data is currently active. When a user attempts to activate a new writing surface 50 using the smart pen 100, the smart pen 100 determines the identifier associated with the writing surface 50 and determines the corresponding binary value from the table. If the value is "1", the smart pen 100 prompts the user, via the display 235 or the speakers 225, to archive the currently active written data before capturing written data from the writing surface, as described above in conjunction with FIG. 2. When a user starts capturing written data from a writing surface 50, the binary value associated with the identifier corresponding to the writing surface 50 is updated to "1." Similarly, when a user archives or deletes written data captured from a writing surface 50, the binary value associated with the writing surface 50 from which written data is being captured is updated to '0." As mentioned above, separate tables are maintained by each smart pen 100, such as the onboard memory 250 of each smart pen 100 including a table, as use of the same writing surface 50 by different smart pens 100 does not present a risk of the written data captured by the different smart pens conflicting.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for associating a source with data captured by a pen-based computing system, comprising:
   receiving an identifier associated with a writing surface from a gesture capture system included on a smart pen;
   determining an encoded pattern associated with the received identifier;
   determining whether previously captured written data is associated with the encoded pattern associated with the received identifier; and
   responsive to determining that the previously captured written data is associated with the encoded pattern associated with the received identifier, generating a request to archive the previously captured written data.

2. The method of claim 1, further comprising:
   receiving an input in response to the request to archive the previously captured written data to an onboard memory;
   disassociating the previously captured written data from the encoded pattern associated with the written identifier; and
   storing the previously captured written data independent from the encoded pattern associated with the written identifier in the onboard memory of the smart pen.

3. The method of claim 2, further comprising:
   receiving, from the smart pen, additional written data coupled to the encoded pattern associated to the writing surface; and
   storing the additional written data in the onboard memory associated with the smart pen without modifying the previously captured written data.

4. The method of claim 2, wherein disassociating the previously captured written data from the encoded pattern comprises:
   separating the previously captured written data from the encoded pattern associated with the writing surface; and
   transmitting the previously captured written data from the onboard memory of the smart pen to a computing system.

5. The method of claim 1, further comprising:
   responsive to determining that the previously captured written data is associated with the encoded pattern, determining whether the previously captured written data is active.

6. The method of claim 1, further comprising:
    capturing additional written data from the writing surface associated with the received identifier via a gesture capture system of the smart pen; and
    storing the additional written data in an onboard memory of the smart pen and storing an association between the additional written data and the encoded pattern associated with the received identifier.

7. The method of claim 1, wherein receiving the identifier associated with the writing surface from the gesture capture system included on the smart pen comprises:
    scanning a sticker affixed to the writing surface using the gesture capture system.

8. The method of claim 1, wherein receiving the identifier associated with the writing surface from the gesture capture system included on the smart pen comprises:
    scanning a predefined portion of the writing surface using the gesture capture system.

9. The method of claim 8, wherein scanning the predefined portion of the writing surface using the gesture capture system comprises:
    scanning a component of the writing surface encoded with the encoded pattern using the gesture capture system; and
    analyzing the encoded pattern.

10. A non-transitory computer-readable storage medium for associating a source with data captured by a pen-based computing system, the non-transitory computer-readable storage medium storing computer-executable instructions for:
    receiving an identifier associated with a writing surface from a gesture capture system included on a smart pen;
    determining an encoded pattern associated with the received identifier;
    determining whether previously captured written data is associated with the encoded pattern associated with the received identifier; and
    responsive to determining that the previously captured written data is associated with the encoded pattern associated with the received identifier, generating a request to archive the previously captured written data.

11. The non-transitory computer-readable storage medium of claim 10, further storing instructions for:
    receiving an input in response to the request to archive the previously captured written data to an onboard memory;
    disassociating the previously captured written data from the encoded pattern associated with the written identifier; and
    storing the previously captured written data independent from the encoded pattern associated with the written identifier in the onboard memory of the smart pen.

12. The non-transitory computer-readable storage medium of claim 10, further comprising:
    responsive to determining that the previously captured written data is associated with the encoded pattern, determining whether the previously captured written data is active.

13. The non-transitory computer-readable storage medium of claim 10, wherein the instructions when executed further cause the processor to perform steps including:
    capturing additional written data from the writing surface associated with the received identifier via a gesture capture system of the smart pen; and
    storing the additional written data in an onboard memory of the smart pen and storing an association between the additional written data and the encoded pattern associated with the received identifier.

14. The non-transitory computer-readable storage medium of claim 10, wherein receiving the identifier associated with the writing surface from the gesture capture system included on the smart pen comprises:
    scanning a sticker affixed to the writing surface using the gesture capture system.

15. The non-transitory computer-readable storage medium of claim 10, wherein receiving the identifier associated with the writing surface from the gesture capture system included on the smart pen comprises:
    scanning a predefined portion of the writing surface using the gesture capture system.

16. The non-transitory computer-readable storage medium of claim 15, wherein scanning the predefined portion of the writing surface using the gesture capture system comprises:
    scanning a component of the writing surface encoded with the encoded pattern using the gesture capture system; and
    analyzing the encoded pattern.

17. A pen-based computing system for associating a source with captured data, the pen-based computing system comprising:
    a processor;
    a gesture capture system coupled to the processor for capturing written data in relation to an encoded pattern on a writing surface from which the written data is captured;
    an onboard memory coupled to the processor and configured to store the written data captured by the gesture capture system;
    a storage medium storing computer program instructions and configured to be executed by the processor, the computer program instructions including instructions for:
        receiving an identifier associated with a writing surface from the gesture capture system;
        determining an encoded pattern associated with the received identifier;
        determining whether previously captured written data is associated with the encoded pattern associated with the received identifier; and
        responsive to determining that the previously captured written data is associated with the encoded pattern associated with the received identifier, generating a request to archive the previously captured written data.

18. The pen-based computing system of claim 17, the non-transitory storage medium further storing instructions for:
    receiving an input in response to the request to archive the previously captured written data to the onboard memory;
    disassociating the previously captured written data from the encoded pattern associated with the written identifier; and
    storing the previously captured written data independent from the encoded pattern associated with the written identifier in the onboard memory of the smart pen.

19. The device pen-based computing system of claim 18, wherein the computer program code further includes instructions for:
    receiving additional written data coupled to the encoded pattern associated to the writing surface; and
    storing the additional written data in the onboard memory without modifying the previously captured written data.

20. The device pen-based computing system of claim 17, wherein the onboard memory stores a binary value associated with the identifier, the binary value indicating whether the onboard memory includes written data associated with the identifier.

21. The pen-based computing system of claim 17, the non-transitory storage medium further storing instructions for:
  responsive to determining that the previously captured written data is associated with the encoded pattern, determining whether the previously captured written data is active.

22. The pen-based computing system of claim 17, the non-transitory storage medium further storing instructions for:
  capturing additional written data from the writing surface associated with the received identifier via a gesture capture system of the smart pen; and
  storing the additional written data in the onboard memory of the smart pen and storing an association between the additional written data and the encoded pattern associated with the received identifier.

23. The pen-based computing system of claim 17, wherein receiving the identifier associated with the writing surface from the gesture capture system included on the smart pen comprises:
  scanning a sticker affixed to the writing surface using the gesture capture system.

24. The pen-based computing system of claim 17, wherein receiving the identifier associated with the writing surface from the gesture capture system included on the smart pen comprises:
  scanning a predefined portion of the writing surface using the gesture capture system.

25. The pen-based computing system of claim 24, wherein scanning the predefined portion of the writing surface using the gesture capture system comprises:
  scanning a component of the writing surface encoded with the encoded pattern using the gesture capture system; and
  analyzing the encoded pattern.

* * * * *

UNITED STATES PATENT AND TRADEMARK OFFICE
CERTIFICATE OF CORRECTION

PATENT NO. : 8,300,252 B2  
APPLICATION NO. : 12/486636  
DATED : October 30, 2012  
INVENTOR(S) : James L. Marggraff Page 1 of 1

It is certified that error appears in the above-identified patent and that said Letters Patent is hereby corrected as shown below:

In the Claims:

Column 16, line 66, claim 20, after "The", delete "device".

Signed and Sealed this  
Third Day of September, 2013

Teresa Stanek Rea  
*Acting Director of the United States Patent and Trademark Office*